(12) United States Patent
Stoller et al.

(10) Patent No.: US 9,417,355 B2
(45) Date of Patent: Aug. 16, 2016

(54) COMPOSITION-MATCHED INELASTIC OR CAPTURE SPECTROSCOPY TOOL

(71) Applicant: Schlumberger Technology Corporation, Sugar Land, TX (US)

(72) Inventors: Christian Stoller, Princeton Junction, NJ (US); Fabien Haranger, Princeton Junction, NJ (US); James Grau, Marshfield, MA (US); Jeffrey Miles, Arlington, MA (US); Markus Berheide, Medford, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 65 days.

(21) Appl. No.: 14/144,871

(22) Filed: Dec. 31, 2013

(65) Prior Publication Data

US 2015/0185358 A1    Jul. 2, 2015

(51) Int. Cl.
 *G01V 5/10* (2006.01)
 *E21B 47/00* (2012.01)

(52) U.S. Cl.
 CPC ........... *G01V 5/101* (2013.01); *G01V 5/10* (2013.01); *E21B 47/00* (2013.01)

(58) Field of Classification Search
 CPC ................ G01V 5/10–5/145; E21B 47/00
 See application file for complete search history.

(56) References Cited

U.S. PATENT DOCUMENTS

| | | | |
|---|---|---|---|
| 4,810,876 A | | 3/1989 | Wraight et al. |
| 5,363,931 A | * | 11/1994 | Moriarty .................... 175/325.5 |
| 7,073,378 B2 | | 7/2006 | Smits et al. |
| 7,633,058 B2 | | 12/2009 | Stoller et al. |
| 7,718,955 B2 | | 5/2010 | Pemper et al. |
| 7,772,545 B2 | | 8/2010 | Galford et al. |
| 8,101,907 B2 | | 1/2012 | Jacobi et al. |
| 2008/0236842 A1 | * | 10/2008 | Bhavsar et al. ............... 166/381 |
| 2011/0222368 A1 | * | 9/2011 | Fussell ........................... 367/25 |

(Continued)

FOREIGN PATENT DOCUMENTS

| | | |
|---|---|---|
| GB | 2145814 | 4/1985 |
| GB | 2254418 | 10/1992 |

(Continued)

OTHER PUBLICATIONS

International search report and written opinion for the equivalent PCT patent application No. PCT/US2014/069927 issued on Mar. 19, 2015.

(Continued)

*Primary Examiner* — Yara B Green
(74) *Attorney, Agent, or Firm* — Cameron R. Sneddon

(57) ABSTRACT

Composition-matched downhole tools and methods for using such tools are provided. One such method includes emitting neutrons using a neutron source in the downhole tool to generate formation gamma rays in a surrounding formation. At the same time, however, some of the neutrons may interact with different parts of the downhole tool to form tool gamma rays. The gamma ray spectra of at least some of the formation gamma rays and the tool gamma rays may be detected using a gamma ray detector. The tool gamma rays from the different parts of the tool may have a substantially similar spectral shape. As such, a processor may be used to analyze the spectra of the tool gamma rays using a single tool background standard, thereby simplifying the analysis and improving the precision of the results.

15 Claims, 10 Drawing Sheets

(56) References Cited

U.S. PATENT DOCUMENTS

| | | |
|---|---|---|
| 2011/0303836 A1 | 12/2011 | Gibson |
| 2012/0126105 A1 | 5/2012 | Evans et al. |
| 2012/0126106 A1 | 5/2012 | Zhou et al. |
| 2012/0138782 A1* | 6/2012 | Simon et al. .................. 250/254 |
| 2013/0134304 A1 | 5/2013 | Beekman et al. |
| 2013/0206972 A1 | 8/2013 | Zhou et al. |

FOREIGN PATENT DOCUMENTS

| | | |
|---|---|---|
| WO | 2009/023437 | 2/2009 |
| WO | 2010/022851 | 3/2010 |
| WO | 2012/162473 | 11/2012 |
| WO | 2012/162477 | 11/2012 |
| WO | 2012/162478 | 11/2012 |

OTHER PUBLICATIONS

J. Tittman, W. B. Nelligan, "Laboratory Studies of a Pulsed Neutron-Source Technique in Well Logging," AIME technical note 2061, SPE paper 1227-G, 1960.

Ellis and Singer, "Well Logging for Earth Scientists," 2nd Edition, Springer 2007.

R. Hertzog et al, "Geochemical Logging with Spectrometry Tools", SPE Journal of Formation Evaluation, 1989, paper 16792.

G. Weller et al, "A New Integrated LWD Platform Delivers Improved Drilling Efficiency," Well Placement and Formation Evaluation Services, SPE paper 96652 Aberdeen, UK, Sep. 6-9, 2005.

R.J. Radtke et al, "A New Capture and Inelastic Spectroscopy Tool Takes Geochemical Logging to the Next Level," 2012 SPWLA Symposium, Paper AAA.

S.L. Herron, and M.M. Herron, "Quantitative Lithology: An Application for Open and Cased Hole Spectroscopy," Trans. SPWLA 37th Ann. Log. Symp., New Orleans, LA, Paper E, 1996.

Herron, M.M. and Herron, S.L., "Quantitative Lithology: Open and Cased Hole Application Derived from Integrated Core Chemistry and Mineralogy Data Base Core-Log Integration;" Geological Society, London, Special Publications, 136, 81-95.

W.A. Hoyer, R. C. Rumble, "Field Experience in Measuring Oil Content, Lithology and Porosity With a High-Energy Neutron-Induced Spectral Logging System," SPE paper 988, 1964.

R.R. Pemper et al., "A New Pulsed Neutron Sonde for Derivation of Formation Lithology and Mineralogy," (SPE 102770), Sep. 2006.

J. Galford et al., "A New Neutron-Induced Gamma-Ray Spectroscopy Tool for Geochemical Logging," 2009 SPWLA symposium, Paper X.

* cited by examiner

COMPOSITION-MATCHED INELASTIC OR CAPTURE SPECTROSCOPY TOOL

BACKGROUND

This disclosure relates to gamma ray well logging tools and, more particularly, to composition-matched tools that produce substantially only one neutron-derived tool noise background spectrum.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A variety of downhole tools may be used to determine the properties of a geological formation surrounding a well. Some downhole tools, known as "neutron-gamma spectroscopy" tools, emit neutrons into the geological formation and detect the spectra of gamma rays that result when the neutrons interact with the elements of the formation. Interactions between the elements of the formation and the neutrons may produce gamma rays in at least two ways: by inelastic scattering and by neutron capture. Inelastic scattering occurs when fast neutrons collide with elements of the formation, which may result in the emission of one or more gamma rays. Neutron capture occurs when lower-energy thermal or epithermal neutrons are captured by the nuclei of elements of the formation, which also may result in the emission of one or more gamma rays. In either case, the various energies of the resulting gamma rays may be detected by gamma ray detectors in the downhole tool to obtain gamma ray spectrum measurements. The spectra of gamma rays obtained at various depths in the well may be used to ascertain a variety of different well properties.

Although many gamma rays are generated through interactions between the emitted neutrons with the elements of the formation, some gamma rays may be generated through interactions of the emitted neutrons with the materials of the downhole tool itself. These gamma rays produce a noise background that may reduce the signal-to-noise ratio (SNR) of the downhole tool spectroscopy measurement. Indeed, neutron interactions with the material of the downhole tool occurring near or within the gamma ray detector itself may substantially increase the amount of unwanted background noise. Since these noise-producing neutron interactions occur close to or inside the detector, the detection probability, even in the presence of a low neutron flux, may be high.

These noise-producing neutron interactions may be partially accounted for during processing, but doing so affects the precision and/or accuracy of the gamma ray spectroscopy measurement. In addition, some of the elements of the formation may also be present in the downhole tool. As such, removing this background noise may further involve attempting to distinguish the unwanted contribution of the background noise from the downhole tool and then accounting for this noise. These additional computations and decisions may further reduce the precision and/or accuracy of the measurement.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Composition-matched downhole tools and methods for using such tools are provided. One such method includes emitting neutrons using a neutron source in the downhole tool to generate formation gamma rays in a surrounding formation. At the same time, however, some of the neutrons may interact with different parts of the downhole tool to form tool gamma rays. The gamma ray spectra of at least some of the formation gamma rays and the tool gamma rays may be detected using a gamma ray spectroscopy detector. The tool gamma rays from the different parts of the tool may have a substantially similar spectral shape. As such, a processor may be used to analyze the spectra of the tool gamma rays using a single tool background standard thus improving the correction for tool background.

In another example, a downhole tool includes a neutron source and a gamma ray detector. The neutron source may emit neutrons into the geological formation to generate formation gamma rays, some of the neutrons penetrating the downhole tool to generate tool gamma rays through interactions with different components of the downhole tool. The gamma ray detector may detect a spectroscopy signal of gamma ray spectra of at least some of the formation gamma rays and some of the tool gamma rays. Spectra of the tool gamma rays deriving from at least two different tool parts—the two tool parts most likely to produce a variable amount of tool gamma rays in different environmental conditions, such as differences in lithology, porosity, and formation salinity, as well as differences in borehole size and mud compositions—may have substantially the same spectral shape. This may enable the spectra of the tool gamma rays to be at least partially removed from the spectroscopy signal using a single tool background standard spectrum.

In another example, a downhole tool includes a collar that can be placed into a geological formation and an internal drilling fluid conduit disposed within the collar. A neutron source may emit neutrons into the geological formation to generate formation gamma rays, though some of the neutrons may penetrate the downhole tool to generate tool gamma rays through interactions with different components of the downhole tool. A gamma ray detector may detect a spectroscopy signal of gamma ray spectra of at least some of the formation gamma rays and some of the tool gamma rays. Spectra of the tool gamma rays deriving from at least an outer diameter of the collar and the internal drilling fluid conduit may have substantially the same spectral shape to enable the spectra of the tool gamma rays to be at least partially removed from the spectroscopy signal using a single tool background standard spectrum.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
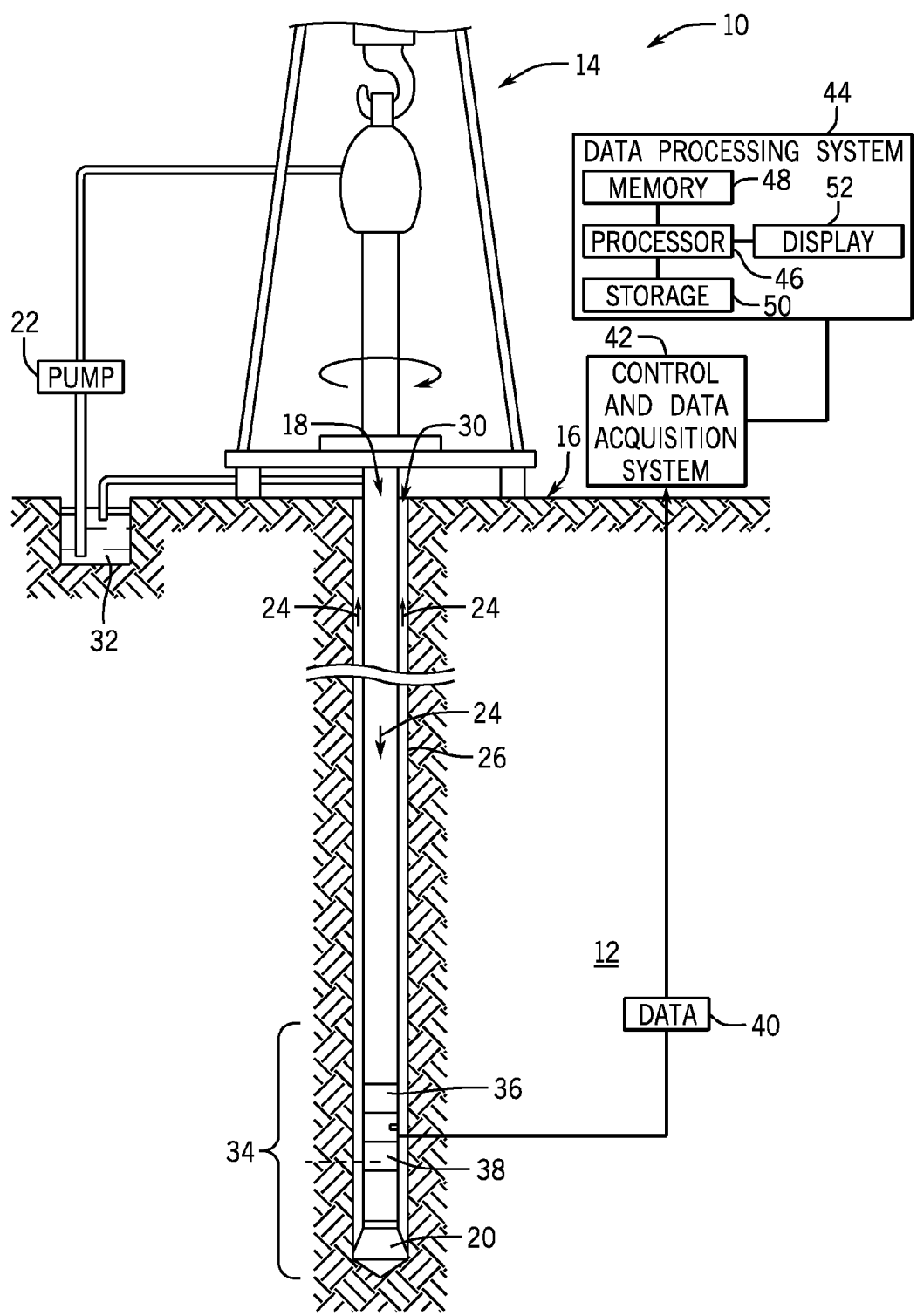
FIG. 1 is a schematic diagram of a drilling system having a composition-matched downhole tool that produces a single tool noise background, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Downhole tools that perform neutron-based gamma ray logging, sometimes known as "neutron-gamma spectroscopy" tools, may emit neutrons into the geological formation and detect the spectra of the resulting gamma rays that occur due to interactions with the geological formation. A neutron-gamma spectroscopy tool may be placed into a well and may emit neutrons into the formation using a neutron source. The neutrons may interact with elements of the formation through inelastic scattering and/or neutron capture to generate gamma rays. In this disclosure, the gamma rays produced by interactions in the formation may be referred to as "formation gamma rays." These resulting formation gamma rays may scatter through the formation. Some of the formation gamma rays may go directly or scatter back to the downhole tool to be detected by one or more gamma ray detectors as gamma ray spectra. The gamma ray spectra at various depths in the well may be processed to determine various properties of the geological formation.

Some of the neutrons emitted by the downhole tool do not produce formation gamma rays in the formation, but rather may scatter back toward the tool. In some cases, when a neutron manages to penetrate into the downhole tool, the neutron could react with the materials of the downhole tool and a gamma ray may be emitted from within the downhole tool. In this disclosure, gamma rays produced by interactions with materials of the downhole tool may be referred to as "tool gamma rays." The spectra of these tool-derived gamma rays caused by neutron capture within the downhole tool represent a tool noise background in the spectroscopy signal detected by the gamma ray detectors.

In this disclosure, the impact of the noise background of tool gamma rays may be reduced through shielding and selection of like materials throughout at least certain areas of the downhole tool. Among other things, the fast neutrons emitted by the neutron source may travel relatively easily through certain of the tool components as they may be less likely to encounter hydrogen. The neutrons may eventually reach the drilling fluid on the outside of the tool or in a drilling fluid conduit such as a mud flow tube or a mud channel, which may cause the neutrons to slow down and eventually become thermalized. The thermalized neutrons may be more likely to be captured by the material of the downhole tool. As such, to reduce the likelihood of capture in the downhole tool materials, both internal and external shielding may be employed. In addition, the unshielded internal and external materials may be largely free of materials expected to be found in the geological formation. In some embodiments, the unshielded internal and external parts both may be of the same material to produce the same tool noise background spectra. Because the noise spectra from these disparate areas of the downhole tool may have the same spectral characteristics, a single noise spectrum may be used in the spectral processing without affecting the accuracy of the result and without the deterioration of the precision that may be associated with the use of two different tool noise background spectra.

Thus, among other things, downhole tools of this disclosure may use composition-matched materials in different tool regions or tool parts to produce the same gamma ray noise spectra from disparate regions or tool parts of the downhole tool. As used herein, the term "tool parts" refers to contiguous components of the downhole tool that serve respective particular purposes. Thus, in some embodiments, the following may be understood to represent different tool parts: a tool collar, a protective cover on the outer diameter of the tool collar, a gamma ray detector (e.g., a scintillator), an internal drilling fluid conduit (e.g., a flow tube), a chassis, a tool pressure housing, a canopy of a detector, a bowspring, or a bowspring shoe, to name a few examples. In one example involving a logging-while-drilling tool, this may mean that first tool gamma rays that result from interactions with the outer diameter of the tool collar (e.g., a protective cover) and second tool gamma rays that result from interactions with an outer diameter of a mud channel or flow tube or a protective cover over the outer diameter of the mud channel or the flow tube may have substantially the same noise spectra. In another example involving a wireline tool, this may mean that first tool gamma rays that result from interactions with the outer diameter of the tool housing (e.g., a protective cover) and second tool gamma rays that result from interactions with a bowspring or a bowspring shoe may have substantially the same noise spectra.

With the foregoing in mind, FIG. 1 illustrates a drilling system 10 that includes the neutron shielding and material selection to reduce the tool noise background. The drilling system 10 may be used to drill a well into a geological formation 12 and obtain gamma ray spectroscopy measurements useful to identify characteristics of the well. In the drilling system 10, a drilling rig 14 at the surface 16 may rotate a drill string 18 having a drill bit 20 at its lower end. As the drill bit 20 is rotated, a drilling fluid pump 22 is used to pump drilling fluid 24, commonly referred to as "mud" or "drilling mud," downward through the center of the drill string 18 in the direction of the arrow to the drill bit 20. The drilling fluid, which is used to cool and lubricate the drill bit 20, exits the drill string 18 through the drill bit 20. The drilling fluid then carries drill cuttings away from the bottom of a borehole 26 as it flows back to the surface 16, as shown by the arrows through an annulus 30 between the drill string 18 and the formation 12. However, as described above, as the drilling fluid 24 flows through the annulus 30 between the drill string 18 and the formation 12, the drilling mud 23 may begin to invade and mix with the fluids stored in the formation, which may be referred to as formation fluid (e.g., natural gas or oil). At the surface 16, the return drilling fluid 24 is filtered and conveyed back to a mud pit 32 for reuse.

As illustrated in FIG. 1, the lower end of the drill string 18 includes a bottom-hole assembly (BHA) 34 that may include the drill bit 20 along with various downhole tools. The downhole tools may collect a variety of information relating to the geological formation 12 and/or the state of drilling of the well. For instance, a measurement-while-drilling (MWD) tool 36 may measure certain drilling parameters, such as the temperature, pressure, orientation of the drilling tool, and so forth. Likewise, a logging-while-drilling (LWD) tool 38 may measure the physical properties of the geological formation 12, such as density, porosity, resistivity, lithology, and so forth.

The LWD tool 38 may collect a variety of data 40 that may be stored and processed within the LWD tool 38 or, as illustrated in FIG. 1, may be sent to the surface for processing. In the example of this disclosure, the LWD tool 38 may include a neutron-gamma spectroscopy tool that may detect the energies of formation gamma rays that result when neutrons are emitted into the well. The range of energies of the detected gamma rays may be visualized as a spectrum of the gamma rays that are detected. The data 40 that is collected may include counts and/or detected energies of neutrons and gamma rays that reach corresponding detectors in the LWD tool 38. The data 40 may be sent via a control and data acquisition system 42 to a data processing system 44. The control and data acquisition system 42 may receive the data 40 in any suitable way. In one example, the control and data acquisition system 42 may transfer the data 40 via electrical signals pulsed through the geological formation 12 or via mud pulse telemetry using the drilling fluid 24. In another example, the data 40 may be retrieved directly from the LWD tool 38 when the LWD tool 38 returns to the surface.

The data processing system 44 may include a processor 46, memory 48, storage 50, and/or a display 52. The data processing system 44 may use the data 40 to determine various properties of the well using any suitable techniques. As will be discussed further below, the LWD tool 38 may use certain selected materials to reduce signal contamination by stray neutrons. Thus, when the data processing system 44 processes the data 40, the determined well properties may be more accurate and/or precise than otherwise. To process the data 40, the processor 46 may execute instructions stored in the memory 48 and/or storage 50. As such, the memory 48 and/or the storage 50 of the data processing system 44 may be any suitable article of manufacture that can store the instructions. The memory 46 and/or the storage 50 may be ROM memory, random-access memory (RAM), flash memory, an optical storage medium, or a hard disk drive, to name a few examples. The display 52 may be any suitable electronic display that can display the logs and/or other information relating to properties of the well as measured by the LWD tool 38. It should be appreciated that, although the data processing system 44 is shown by way of example as being located at the surface, the data processing system 44 may be located in the LWD tool 38. In such embodiments, some of the data 40 may be processed in the LWD tool 38 and that the data 40 may be stored in the LWD tool 38, while some of the data 40 may be sent to the surface in real time. This may be the case particularly in LWD, where a limited amount of the data 40 may be transmitted to the surface during drilling or reaming operations.

Figure 2:
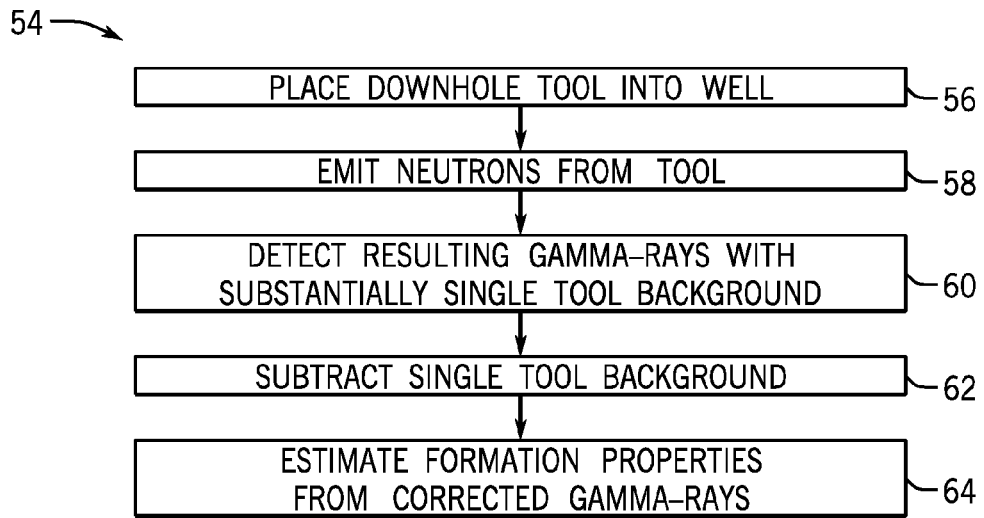
FIG. 2 is a flowchart of a method for measuring a well using the downhole tool of FIG. 1, in accordance with an embodiment.

It should be noted that, although the neutron-gamma spectroscopy tool of this disclosure is described by way of example in a logging-while-drilling (LWD) configuration, any other suitable means of conveyance may be employed (e.g., wireline, slickline, coiled tubing, and so forth). Regardless of the means of conveyance, the neutron-gamma spectroscopy tool of this disclosure may log the borehole 26 according to a flowchart 54 of FIG. 2. Specifically, the neutron-gamma spectroscopy tool may be placed into the well drilled in the geological formation 12 (block 56). The neutron-gamma spectroscopy tool may emit neutrons into the geological formation 12 to cause gamma rays to be created through inelastic scattering and/or neutron capture (block 58). The neutron-gamma spectroscopy tool may detect the spectra of the gamma rays that return to the tool (block 60). Some of these gamma rays may have scattered in the formation, the borehole or the tool itself before being detected. Others may arrive at the tool without any intervening scattering and thus conserve their full initial energy. Because the materials in different areas of the tool may be substantially matched to one another, while also being substantially unlike the materials found in the wellbore 26 or the formation 12, substantially only a single tool background (e.g., a single capture tool background (CTB)) may result. As such, the data processing system 44 may subtract out this single tool background without the loss of accuracy or without the loss of precision that may be incurred when subtracting two different capture tool background contributions (block 62). The resulting filtered spectra then may be used to estimate any suitable formation properties using any suitable techniques (block 64).

Figure 3:
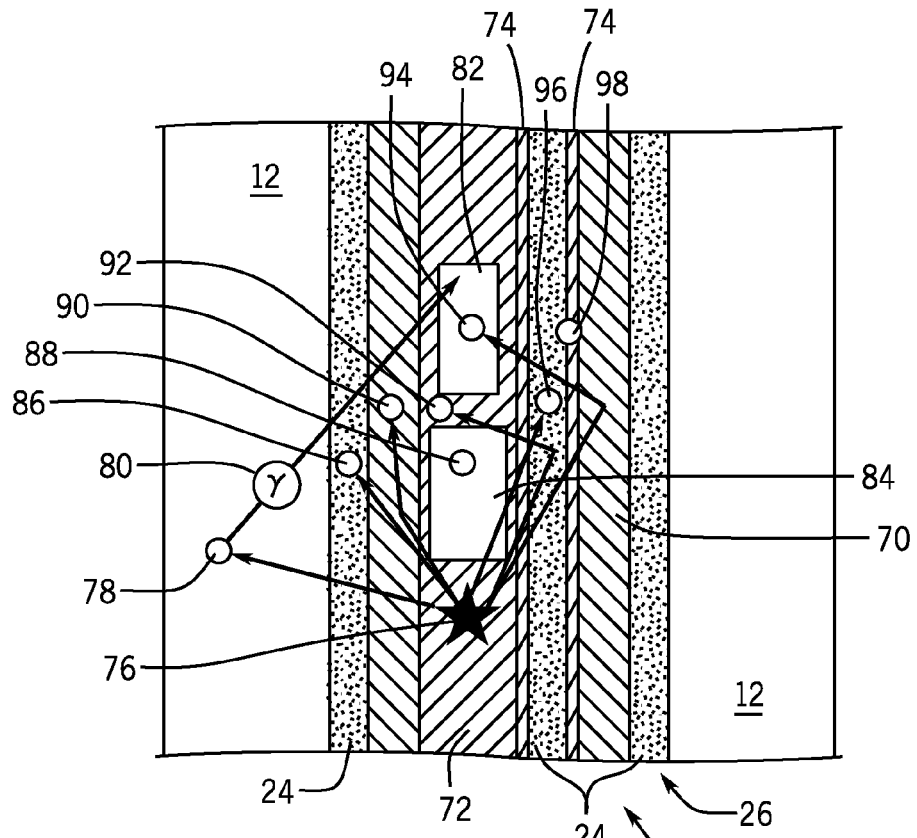
FIG. 3 is a block diagram illustrating potential areas for the production of neutron induced gamma rays in and around the downhole tool, in accordance with an embodiment.

One example of a suitable neutron-gamma spectroscopy downhole tool 68 is shown in FIG. 3 to log the wellbore 26 within the geological formation 12. The downhole tool 68 is shown in an LWD configuration. A tool collar 70 holds a tool chassis 72 with a mud flow tube 74, through which drilling fluid 24 may pass through the drill string 18. A neutron source 76 that may be mounted in the tool chassis 72 and may emit neutrons 78 into the geological formation 12. The neutron source 76 may be any suitable source of neutrons 78. By way of example, the neutron source 76 may be a radioisotopic source such as $^{241}$AmBe or $^{252}$Cf. Additionally or alternatively, the neutron source 76 may be an electronic neutron generator that relies on a neutron-generating nuclear reaction such as d-T, d-D or t-T to name a few. In one example, the neutron source 76 may be a neutron generator used commercially by Schlumberger Technology Corporation and with a neutron generator tube known by the Minitron trademark. When the neutron source 76 is an electronic neutron generator, the neutron source 76 may emit the neutrons 78 continuously or in timed bursts.

The neutrons 78 may also interact with the formation 12 in ways that produce gamma rays 80. As noted above, the gamma rays 80 that are generated in the formation 12 may be referred to collectively as "formation gamma rays" to distinguish them from those formed from interactions with materials of the downhole tool 68. The neutrons 78 may generate the gamma rays 80 in the formation 12 through inelastic scattering and/or neutron capture. Inelastic scattering may produce gamma rays 80 through interactions with fast neutrons 78 and elements of the formation 12. One example of a reaction caused by inelastic scattering is $^{A}X(n,n'\gamma)^{A}X^*$, in which the inelastic scattering causes the nucleus of the isotope $^{A}X$ (where A denotes the mass number of the nucleus and X is the symbol of the corresponding element) to enter an excited state $^{A}X^*$, which may decay by the emission of one or more gamma rays 80. Other reactions caused by fast neutron interactions may be of the type (n,2n), (n,p), or (n,α), to name a few. Neutron capture may produce gamma rays 80 from the capture of mostly thermal and epithermal neutrons 78 by a nucleus. The capture may result in the creation of an excited nucleus with mass number A+1. The excited state may decay by the emission of one or more gamma rays 80.

The formation gamma rays 80 may be detected by one or more gamma ray detectors 82. These gamma rays detectors 82 may be scintillation detectors that include a scintillation crystal and a photomultiplier. The gamma ray detectors 82 may detect the spectra—that is, the range of energies—of the formation gamma rays 80. Additionally, however, the gamma ray detectors 82 may detect gamma rays that occur in the borehole 26 or the downhole tool 68 itself. Indeed, the neutrons 78 may scatter through or around the shielding 84 and other surrounding materials to generate gamma rays from unintended locations. Other gamma rays may be generated, for example, by neutrons 78 reacting with elements of the drilling fluid 24 in the borehole (numeral 86); the shielding 84 (numeral 88); the tool collar 70 (numeral 90); the tool chassis 72 (numeral 92); the gamma ray detector 82 itself (numeral 94); the drilling fluid 24 within the mud flow tube 74 (numeral 96); and/or the mud flow tube 74 (numeral 98); to name only a few locations where additional gamma rays may be generated. The gamma rays generated through these reactions outside of the formation 12 may not provide substantial information regarding the properties of the geological formation 12. As such, the spectra of these gamma rays generated outside of the geological formation 12 may represent noise to be subtracted from the overall spectral signal. The presence of this background noise may increase the uncertainty of the gamma ray spectroscopy measurement.

As will be discussed further below, while options to change the contribution of gamma rays from the drilling fluid 24 (mud) are very limited, the contribution from materials in the tool can be reduced according to this disclosure with neutron shielding and attention to the selection of the materials from which the downhole tool 68 is constructed. In particular, materials close to the gamma ray detector(s) 82 may be chosen appropriately to reduce the probability of unwanted gamma rays being generated and reaching the gamma ray detector(s) 82. In addition, materials that are more likely to generate gamma rays, such as protective covers to neutron shielding materials, may be selected to be comparatively unlike the elements expected in the formation 12. Moreover, disparate areas of the downhole tool 68—particularly those areas of the downhole tool 68 that are more likely to produce gamma rays—may be selected to have similar materials that produce similar background noise spectra. In this way, the different background noise spectra may be accounted for using only one tool background spectrum standard (e.g., a capture tool background (CTB) spectrum standard) common to the different areas of the downhole tool 68.

Figure 4:
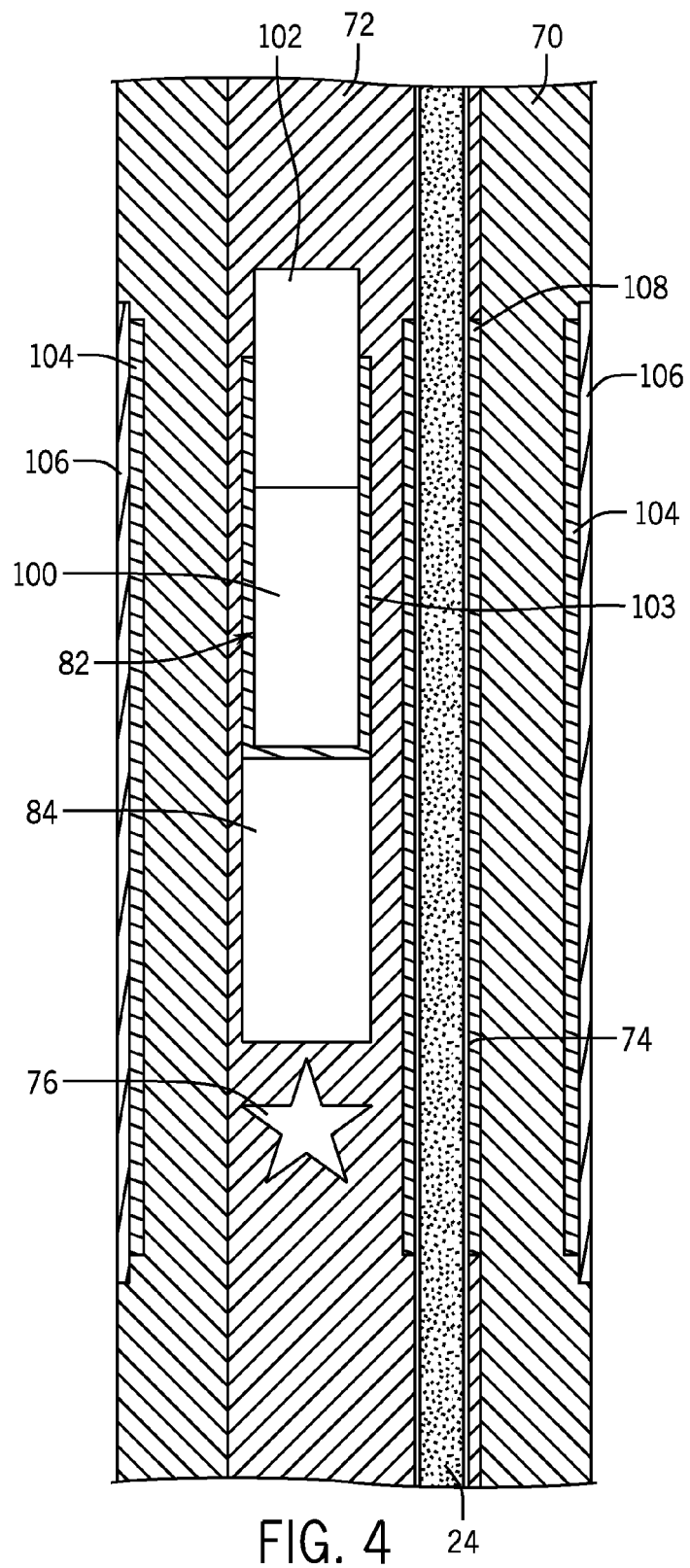
FIG. 4 is a block diagram of the downhole tool that includes composition-matched materials and neutron shielding that produce a single tool noise background, in accordance with an embodiment.

Shielding and materials that may be used in the downhole tool 68 appear in a more detailed schematic view shown in FIG. 4. In the example of FIG. 4, the tool collar 70 holds the tool chassis 72 with the flow tube 74, through which drilling fluid 24 may pass through the drill string. The neutron shield 84 may be a relatively large block of shielding to prevent fast neutrons from passing directly from the neutron source 76 to the detector 82. Any suitable material may be used. In some examples, Tungsten may be used to at least attenuate the fast neutron flux from the neutron source 76. Since the attenuation of the fast neutron flux is dominated by inelastic reactions, additional neutrons of lower energy may be produced. Due to the high density and high atomic number of Tungsten, this material may also serve as an effective shield against gamma rays originating close to the neutron source 76 or in the material of the neutron shielding 84 itself.

As such, the neutron shield 84 may shield the detector 82 from many, but not all, stray neutrons emitted from the neutron source 76. To reduce the impact of such stray neutrons on the detector 82, which may include a scintillator 100 and a photomultiplier 102, a detector shield 103 may shield at least the scintillator 100. In addition, an external neutron shield 104 protected by a protective cover 106 may surround at least part of the outer circumference of the downhole tool 68 near the scintillator detector 82. Moreover, since neutrons may pass relatively easily through the drilling fluid 24 in the mud flow tube 74, a flow tube neutron shield 108 may absorb many of the neutrons that could enter the downhole tool 68 in this manner.

The detector shield 103, external neutron shield 104, and/or the flow tube neutron shield 108 may suppress or reduce the flux of thermal and epithermal neutrons in or into the downhole tool 68. This may prevent these neutrons from interacting with the materials in the downhole tool 68 and from creating a larger capture gamma ray background than otherwise. In some examples, the detector shield 103, external neutron shield 104, and/or the flow tube neutron shield 108 may include a neutron-absorbing material such as boron; boron carbide; boron enriched in $^{10}$B, which is the neutron absorbing isotope as mentioned above; a compound of $^{10}$B, such as $^{10}$B$_4$C; a borosilicate; lithium; cadmium; samarium;

or gadolinium; among many other materials with neutron-absorbing properties. In some embodiments, these neutron-absorbing materials may be mixed with an otherwise inert material, such as poly ether ether ketone (PEEK) or poly ether ketone ketone (PEKK), to offer two examples.

The use of $^{10}$B could introduce some additional noise in certain situations. In particular, the neutron reaction with boron-10 ($^{10}$B(n,α)$^7$Li) may result in the emission of a 478-keV gamma ray. In certain situations, however, gamma rays of lower energy may not be of interest. In fact, the 478-keV gamma rays may be used to obtain additional information or to provide a means of gain-stabilizing a gamma ray detector. Such uses are described in U.S. Published Patent Applications 2013/0206972, "Neutron Detection Based on a Boron Shielded Gamma Detector;" 2013/0134304, "Method and Apparatus for Gain Regulation in a Gamma Detector;" and/or 2012/0126106, "Neutron Detection Using a Shielded Gamma Detector;" all of which are assigned to Schlumberger Technology Corporation and incorporated by reference herein in their entirety for all purposes.

In general, however, the low-energy gamma ray of 478 keV emitted by $^{10}$B may be outside of the range of energies of interest for downhole gamma ray spectroscopy, which may focus on gamma rays with energies greater than 1 MeV. In certain gamma ray spectroscopy cases that consider lower-energy gamma rays of less than 1 MeV, in which case the 478-keV gamma rays could introduce additional noise, a gamma ray shield that suppresses lower-energy gamma rays not likely to derive from the formation 12 (e.g., a gamma ray shield between the detector 82 and the mud flow tube 74 or a mud channel) or a different material with a lower likelihood of generating these lower-energy gamma rays may be used. One such material may be $^6$Li. Indeed, $^6$Li or $^6$Li-compounds may be used instead of or in addition to $^{10}$B or other neutron absorbers such as Cd, Sm, or Gd, to name a few, since all of the latter elements emit high-energy gamma rays following neutron capture. The disadvantage of $^6$Li may be its lower neutron absorption cross section of 940 b for thermal neutrons at room temperature, which is about 4 times smaller than that of $^{10}$B (3840 b). This lower neutron absorption cross section suggests that a greater concentration of $^6$Li or thicker shielding of $^6$Li may be used to achieve comparable neutron-absorbing results to the neutron absorption of $^{10}$B. Suitable Li-compounds may include LiF and Li$_2$CO$_3$, since F, C, and O have relatively small neutron capture cross sections. This may result in minimal, if any, contribution from neutron capture and, accordingly, relatively few resulting gamma rays from the materials in the compound.

The material used in the detector shield 103, external neutron shield 104, and/or the flow tube neutron shield 108 may also include a metal alloy, such as an Al—Li alloy. These alloys may be found in aerospace applications and may contain up to 4% lithium. These metal alloys may be produced with natural lithium, which contains about 7.5% $^6$Li, or with enriched $^6$Li, which may contain 90% or more $^6$Li. Additionally or alternatively, lithium or lithium compounds that are more chemically inert than the metal may be embedded in organic materials such as PEEK, PEKK, polycarbonates and other similar materials. In yet another approach, Li could be part of a ceramic material or embedded in a ceramic matrix. Li$_2$O (Lithia) may be used in ceramic compounds and Li-disilicate may be used in glass-ceramics. Lithia ceramic, because of its low atomic number, may have excellent gamma ray transmission capabilities. For example, silicones used in downhole applications may be mixed with neutron absorbing materials. Yet another approach may be in the use of sintered or dispersed nanomaterials such as beryllium boride, which may act as both a neutron absorber and a neutron reflector, while providing excellent gamma ray transmission. Likewise, boron carbide ceramic is yet another possible shielding material.

The external neutron shield 104 represents a neutron absorbing layer surrounding the downhole tool 68 as completely as possible. Thus, the external neutron shield 104 may include $^{10}$B, $^{10}$B$_4$C, or natural boron containing about 20% of the $^{10}$B-isotope, or any of the neutron-absorbing materials discussed above, embedded in an otherwise inert material (e.g. in a silicone or other elastomer). Additionally or alternatively, the external neutron shield 104 may include a coating with a material that contains $^{10}$B applied directly to the outer surface of the tool collar 70 in a suitable thickness. Another approach to the external neutron shield 104 may be described in U.S. Patent Application 2011/0303836, "Ruggedized Neutron Shields," which is assigned to Schlumberger Technology Corporation and incorporated by reference herein in its entirety for all purposes. To conserve the integrity of the external neutron shield 104 and to ensure that its thickness—and therefore its neutron-absorbing properties—be conserved, the external neutron shield 104 may be surrounded by the protective cover 106 to prevent damage. The protective cover 106 may include any suitable materials, such as steel or a nickel alloy (e.g., INCONEL®).

The detector shield 103 may be applied close to the gamma ray detector 82. One example of the detector shield 103 may be that described in U.S. Pat. No. 7,633,058, "Hermetically Sealed Packaging and Neutron Shielding for Scintillation-Type Radiation Detectors," which is assigned to Schlumberger Technology Corporation and incorporated by reference herein in its entirety for all purposes. The detector shield 103 may be extended to also surround part or all of the photomultiplier 102 and/or the space between the scintillator 100 and the in-line neutron-gamma shield 84. The detector shield 103 may reduce the probability of gamma ray generation in the scintillator 100 itself by neutrons that were not absorbed in the external shielding 104.

The flow tube shield 108 may prevent thermal and epithermal neutrons originating inside the flow tube 74 from entering the downhole tool 68 and interacting with its materials. The flow tube shield 108 may be formed using the same materials as the external neutron shield 104. Given that the flow tube 74 is inside the downhole tool 68, in some embodiments, no special protective layer may be used. In other embodiments, such as those in which the neutron-absorbing material may be damaged by corrosive drilling fluid 24, a protective layer comparable to the protective cover 106 may protect the flow tube shield 108. In general, as long as the flow tube shield 108 is (as shown in FIG. 3 and FIG. 4) on the outside of the flow tube 74, there may not be a protective layer, since the flow tube 74 may act as the protective shield of the neutron shield. It may be mechanically difficult to place the flow tube shield 108 on the inside of the flow tube 74. As such, in some embodiments, neutron shielding may instead be placed adjacent to the flow tube 74 between the flow tube 74 and the detector shielding 103. In other words, in some embodiments, the flow tube 74 itself may be unshielded as it may be difficult to shield the inner surface of the flow tube 74, which is exposed to the drilling fluid 24. If there is no flow tube 74 but rather a hole in the chassis 72, shielding may be difficult, although one could envisage a liner in the hole, if it can resist the abuse by the fast flowing corrosive and abrasive drilling fluid 24.

Figure 5:
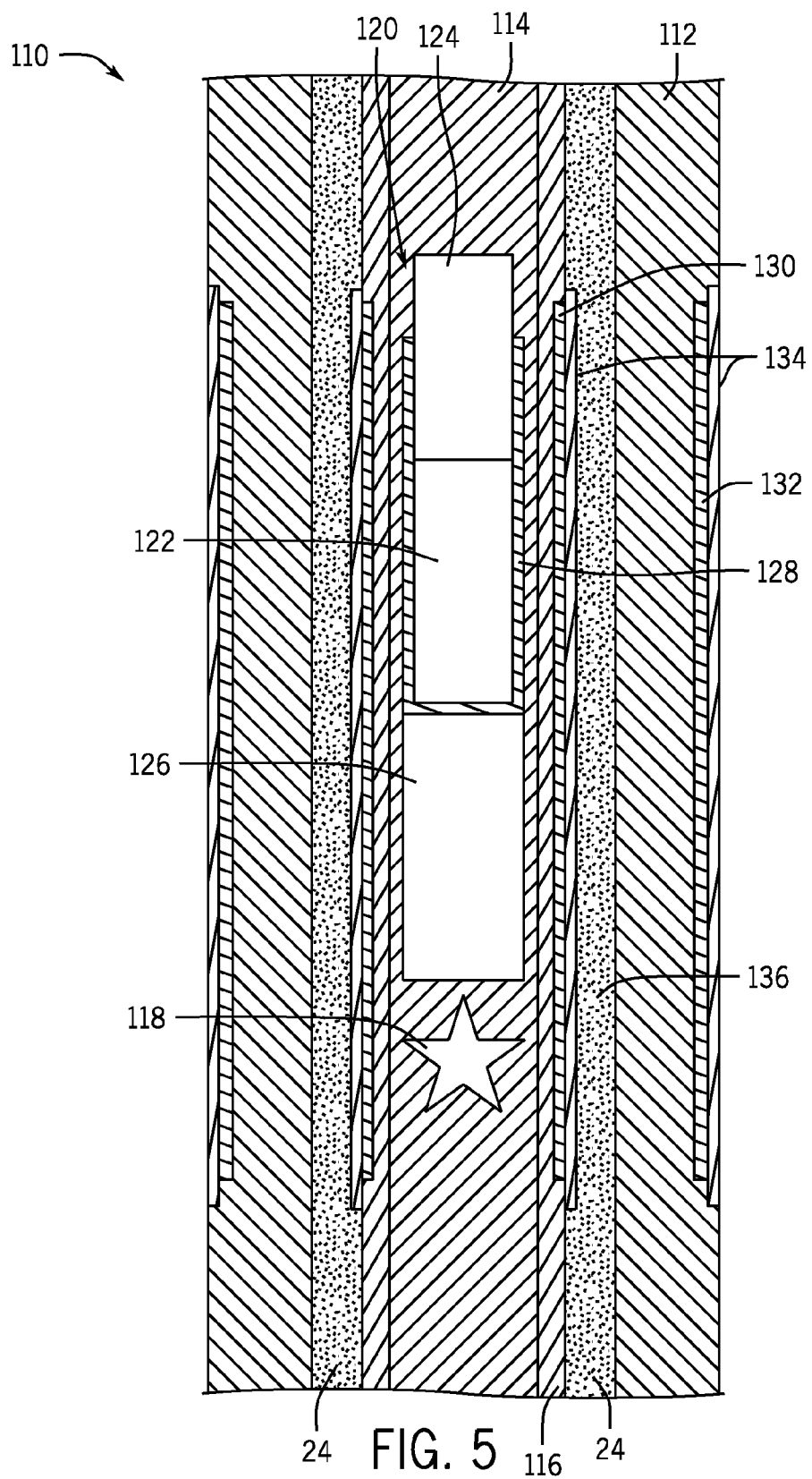
FIG. 5 is a block diagram of a mandrel downhole tool that includes composition-matched materials and neutron shielding that produce a single tool noise background, in accordance with an embodiment.

Another example of the downhole tool 68, shown as a mandrel tool 110, appears in FIG. 5. The mandrel tool 110 includes a tool collar 112 and a tool chassis 114. A mandrel pressure housing 116 surrounds the chassis 114. A neutron source 118 may be any suitable neutron source, such as those discussed above. A detector 120 may detect the spectra of gamma rays produced by neutrons emitted by the neutron source 118. The detector 120 may include a scintillator 122 and a photomultiplier 124 in the manner discussed above. Likewise, neutron shielding 126 and detector shielding 128 may shield the detector 120 from neutrons in the manner also discussed above with reference to FIG. 4.

The mandrel tool 110 may include a mandrel neutron shield 130 and an external neutron shield 132. In some embodiments, protective covers 134 may cover the mandrel neutron shield 130 and the external neutron shield 132 to reduce the effect of corrosive or abrasive drilling fluid 24 (e.g., in a mud channel 136) or exposure to the formation 12. The mandrel neutron shield 130 and the external neutron shield 132 may include any suitable neutron-absorbing materials, such as those discussed above. Moreover, in some embodiments, the protective cover of the mandrel neutron shield 130 and the protective cover of the external neutron shield 132 may be of substantially the same materials. In addition, the collar material, the inside of which may not be shielded against neutrons may need to have a similar composition as well. Additionally or alternatively, the protective covers 134 may be of substantially the same materials to cause the mandrel tool 110 to produce substantially only one tool noise background signal.

Since the mandrel tool 110 represents a tool in which the measurement section is in its own pressure housing 116 inside a mud channel 136 filled with drilling fluid 24, no shielding is shown on the outside of the channel filled with the drilling fluid 24 (i.e., on inner diameter of the tool collar 112). Indeed, it may be mechanically difficult to place neutron shielding on the inside of the tool collar 112. Partial or complete shielding may be obtained, however, using specially designed centralizers for the mandrel 116 inside the collar 112. Additionally or alternatively, the mandrel neutron shield 130 and/or protective cover 134 may be part of a mechanical structure used to centralize the mandrel pressure housing 116 in the tool collar 112 and to reduce shock and shock amplification for the mandrel pressure housing 116.

Figure 6:
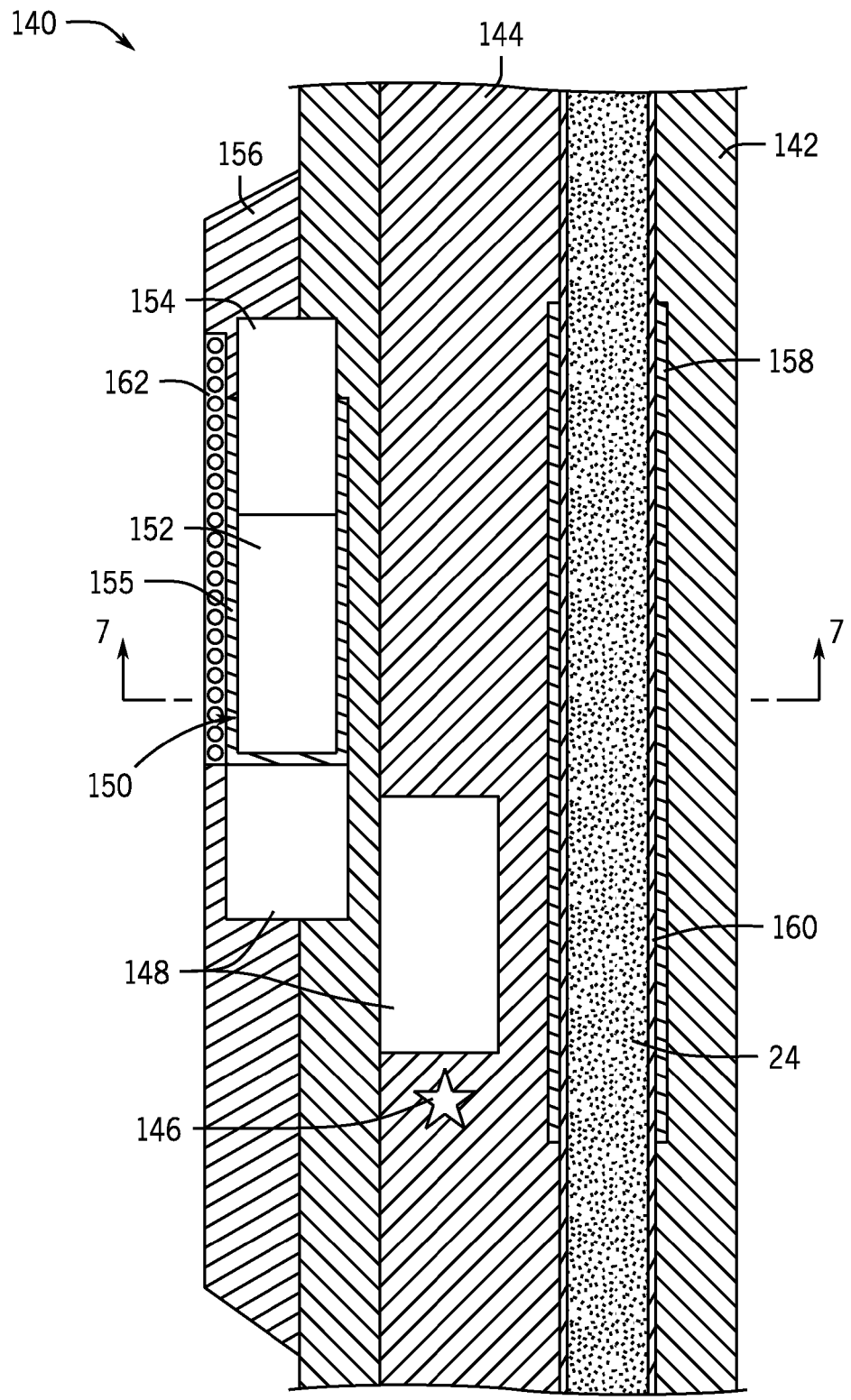
FIG. 6 is a block diagram of a stabilizer-mounted downhole tool that includes composition-matched materials and neutron shielding that produce a single tool noise background, in accordance with an embodiment.

A stabilizer-mounted tool 140 appears in FIG. 6. The stabilizer-mounted tool 140 includes a tool collar 142 and a tool chassis 144. A neutron source 146 may be any suitable neutron source, such as those discussed above. Neutron shielding 148 may shield the detector 150 from neutrons in the manner also discussed above with reference to FIG. 4. The detector 150 may include a scintillator 152 and a photomultiplier 154, and may also be shielded by a neutron shield 155, all of which may be mounted in a blade of a stabilizer 156. Flow tube shielding 158 may include neutron shielding in a flow tube 160 of the stabilizer-mounted tool 140. In some embodiments, an additional external stabilizer shield 162 may provide additional shielding of the detector 150 from the borehole 26. In some embodiments, a protective cover may cover the external stabilizer shield 162. The material making up the stabilizer 156 may be selected to have a low thermal neutron capture cross section. Note, also, that the neutron source 146 may be a compact neutron generator that may be mounted under a stabilizer that is in line with the neutron shield 148 in the stabilizer.

Figure 7:
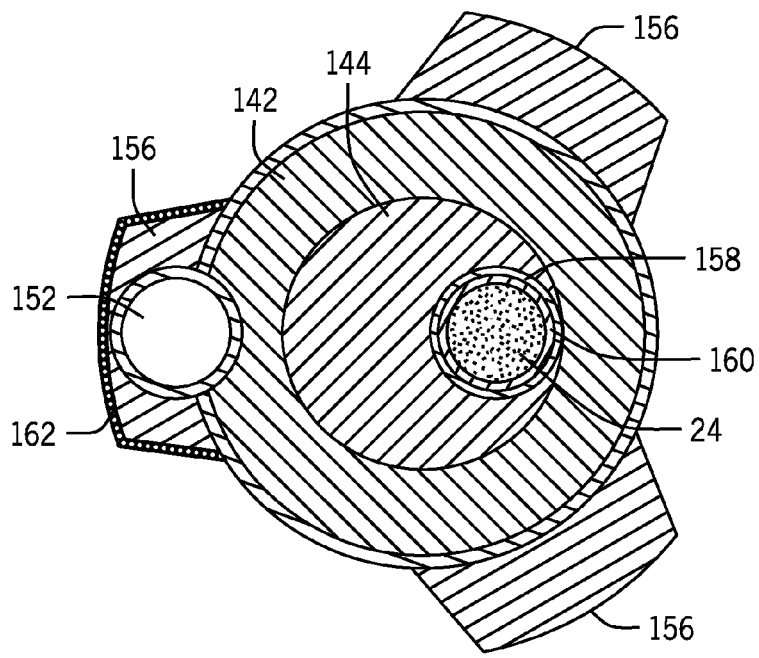
FIG. 7 is a cross-sectional view of the stabilizer-mounted downhole tool of FIG. 6, in accordance with an embodiment.

FIG. 7 is a cross-sectional view of the stabilizer-mounted tool 140 at cut lines 7-7 of FIG. 6. In FIG. 7, the detector shield 155 may be embedded under a three-blade stabilizer 156. In this case, the stabilizer 156 serves as the protective cover over the detector shield 155. The external stabilizer shield 162 may include a boron carbide or similar neutron absorbing coating on the stabilizer 156, which could serve as a neutron shield as well and as protection against tool wear. However, given that the stabilizers 156 may wear significantly during drilling, such an approach may make the capture background highly dependent on tool wear. An additional inert protective layer (e.g., a sacrificial layer) may be used over the external stabilizer shield 162 to reduce the effect of tool wear on the neutron-absorbing properties of the stabilizer shield 162. Additionally or alternatively, the chassis 144 may be shielded at the interface between the collar 142 and the chassis 144.

The downhole tools 68, 110, and 140 are provided by way of example, and are not intended to be exhaustive. Moreover, the positioning and the material selection for the neutron shielding discussed above may be optimized through nuclear modeling or experiments.

As may be appreciated, no amount of neutron shielding may completely eliminate the tool background noise due to neutrons. Indeed, complete shielding from thermal, let alone fast neutrons may not be accomplished. In particular, there are two areas that may be virtually unshielded with respect to thermal and epithermal neutrons. In the downhole tool 68, these areas may include the protective cover 106 and the material of the flow tube 74. In the mandrel tool 110, these areas may include the protective cover 134 and/or the collar 112, which, on its inner diameter, may not be shielded against thermal neutrons. In the stabilizer-mounted tool 140, these areas may be the material of the flow tube 160 and the stabilizer 156 itself or a protective cover over the stabilizer 156. In addition, none of the neutron shields discussed above may provide perfect protection, as some neutrons may scatter inside the respective tool or may pass through the shielding material.

In the case of thermal and epithermal neutron capture, the interactions of the neutrons with tool materials may give rise to the tool capture background signal. This background signal has two detrimental effects on capture spectroscopy: (1) the additional signal contributes to the total gamma ray spectrum detected by the gamma ray detector (e.g., 82, 120, or 150) and may be accounted for in post-processing, but doing this may affect the precision and/or accuracy of the measurement; and (2) if the tool background capture signal contains responses to elements that are also in the geological formation 12, an accurate subtraction of such background may be difficult and may introduce additional uncertainty that may lead to reduced precision and/or accuracy.

The amount of tool capture background may depend on a combination of the tool material properties and the thermal neutron flux entering from the borehole 26, from the flow tube (e.g, 74 or 160) or mud channel (e.g., 136) and through the bulk of the tool (e.g., 68, 110, or 140) itself. The neutron flux and, as a consequence, the total and relative contributions of gamma ray spectra detected by the gamma ray detector (e.g., 82, 120, or 150) from the different regions of the downhole tool (e.g., 68, 110, or 140) may change depending on the properties of the drilling fluid 24 and the formation 12. The total neutron flux may be reduced by including the neutron shielding discussed above, as well as by locating the detectors (e.g., 82, 120, or 150) in such a way as to reduce the amount of material around them that can give rise to background.

To reduce the effect of the changing properties of the drilling fluid 24 and formation 12 on the tool capture background, the various materials used in the downhole tool (e.g., 68, 110, or 140) may be selected to avoid chemical elements that are likely to be in the formation 12, especially in areas that are poorly shielded against neutrons. Moreover, the material selection may be the same in different regions of the downhole tool (e.g., 68, 110, or 140), especially those areas of the downhole tool (e.g., 68, 110, or 140) that contribute most to the tool background signal. In this way, differences in the contributions from the different areas do not show a difference in spectral response. That is, the standard spectra representing the tool contributions (e.g., capture tool background, or CTB) may have the same spectral appearance despite deriving from different areas of the downhole tool (e.g., 68, 110, or 140). In this way, the spectroscopy measurement obtained by the gamma ray detectors (e.g., 82, 120, or 150) may be analyzed using a single tool noise background spectrum, rather than multiple tool noise spectra. This may reduce the uncertainty introduced in the analysis process and, accordingly, improve the precision and/or accuracy of the spectroscopy signal.

Materials that may be found in the formation 12 may include, among many others, Iron (found in shales, Siderite, and Pyrite, to name a few), Aluminum (found in shales), and Silicon (found in sandstone and shales). While it may be straightforward to avoid the use of Aluminum and Silicon near the detectors (e.g., 82, 120, or 150), Iron may be ubiquitous in the downhole tool (e.g., 68, 110, or 140). Indeed, the collar (e.g., 70, 112, or 142) may contain more than 50% iron and the chassis (e.g., 72, 114, or 144) may be stainless steel such as 17-4PH or 304 series steel. In some embodiments, other materials that have much lower iron content, such as alloys with high nickel content (e.g., INCONEL® 718—whose composition is $NiCr_{19}Fe_{19}Nb_5Mo_3$) or titanium alloys (though it may be noted that titanium may also occur in the formation 12), may be used. These materials, however, may be expensive or may introduce mechanical constraints. In one embodiment, iron depleted of the main isotope (56Fe) for critical parts, in particular 58Fe, which has a lower thermal neutron capture cross section, may be used without affecting the mechanical properties of the material. Similarly, the most suitable isotope of various materials that have been used in downhole tools may be selected, although doing so may be costly.

In this disclosure, disparate materials of the downhole tool (e.g., 68, 110, or 140) may be matched, particularly in parts that most contribute to the tool background. This may reduce or eliminate the variability of the spectral shape of the tool background as a function of the relative contributions from different regions.

Contributions from neutrons entering from the mud flow tube (e.g., 74 or 160) or the mud channel (e.g., 136) may be virtually unaffected by the external environment (e.g., borehole size, formation porosity, thermal neutron capture cross section (sigma), borehole fluid properties (e.g., hydrogen index, sigma, density, and so forth, which may differ from the drilling fluid 24 flowing through down from the mud pit 32)). The neutron flux from the mud flow tube (e.g., 74 or 160) or the mud channel (e.g., 136), however, may be affected by the properties of the drilling fluid 24 flowing through the drill string 18 down from the mud pit 32 inside (e.g., hydrogen index, salinity (sigma), and density). For an annular tool such as the downhole tools 68 and 140, this may involve using materials with very similar compositions for the flow tubes 74 and 146 as for the protective cover 106 and other areas that may be more likely to contribute substantially to the tool noise background. For a mandrel tool such as the mandrel tool 110, the pressure housing 116 and the external protective cover 134 may have similar compositions. In addition, the composition of the collar 112 may be similar to that of the pressure housing 116, since it may be difficult to shield the inner diameter of the collar 112 from thermal neutrons.

Tool noise background due to inelastic gamma rays may also be reduced by material selection. As mentioned above, inelastic gamma rays are created by inelastic scattering of high energy neutrons on nuclei or by nuclear reaction of high energy neutrons with nuclei. It may be difficult to shield high energy neutrons given their very penetrating nature. Tungsten and/or similar materials may be used to attenuate the flux of high energy neutrons in the neutron shields 84, 126, and/or 148 in the examples discussed above. However, the slowing down and attenuation process may create a large number of gamma rays. Yet Tungsten also has a large gamma ray absorption cross section and a substantial attenuation of gamma rays may be achieved using a few centimeters of the material. As such, in one example, the neutron shields 84, 126, and/or 148 may provide at least 4 centimeters of thickness. Attenuation (moderation) of the high energy neutron flux may also be achieved by scattering on hydrogen nuclei. Thus, in some embodiments, the neutron shields 84, 126, and/or 148 or the other neutron shields discussed above, may use hydrogenous materials such as organic compounds, water, or metal hydrides such as Titanium hydride. In all cases, a thickness of approximately 4 cm or more of the material may be used to achieve moderation of the neutrons so that their energy drops below the threshold for inelastic interactions (i.e., less than about 1 MeV).

The approaches for reducing the tool background for capture gamma rays, and to make the spectral shape of the tool background for capture gamma rays independent of the drilling fluid 24 and formation 12 properties may not be directly applicable to inelastic gamma rays. Except for the neutron shields (e.g., 84, 126, and/or 148) between the source (e.g., 76, 118, and/or 146) and the gamma ray detector (e.g., 82, 120, and/or 150) against direct radiation, there may not be enough physical space for significant fast neutron suppression and a concomitant reduction in inelastic tool background (ITB). Selection of materials and placement of components may reduce the inelastic tool background (ITB) and made consistent for a large variety of logging environments.

For example, optimizing the inelastic response to achieve a relatively small inelastic tool background (ITB), certain specific materials may be selected near the detectors (e.g., 82, 120, and/or 150). There are elements that have relatively small inelastic cross sections or, in the case of hydrogen, no inelastic cross section in the neutron energy range of interest (e.g., up to 14.1 MeV, which may be output by certain electronic neutron sources). Beryllium is an example of a material that will undergo nuclear reactions such as $^9Be(n,2n)^8Be$, where $^8Be$ decays immediately into two alpha particles, but these reaction products do not emit gamma rays. As such, Beryllium may be used as a material in the downhole tools 68, 110, and/or 140.

Figure 8:
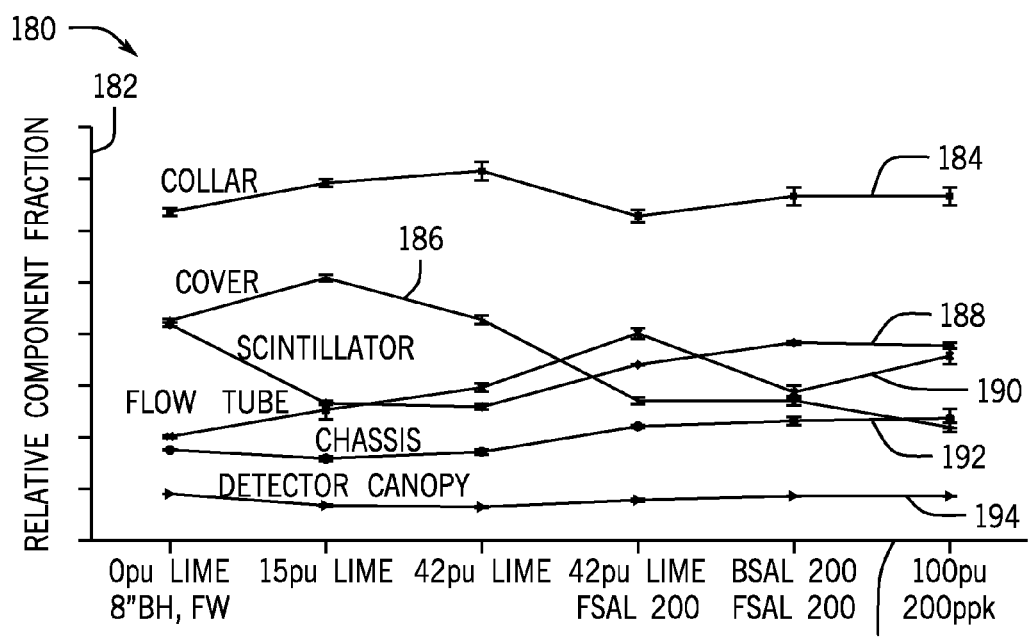
FIG. 8 is a plot illustrating tool noise contributions of various components of the downhole tool when used in different geological formations and/or well conditions, in accordance with an embodiment.

As shown by a plot 180 of FIG. 8, modeling may help identify some of the major contributors to the tool background. In some embodiments, only some areas may be adjusted. In the plot 180, an ordinate 182 represents a relative component fraction of the background contribution and an abscissa 184 represents various modeled logging environments. Shown in the plot 180 are contributions from the collar 72 (line 184), the protective cover 106 (line 186), the scintillator 100 (line 188), the flow tube 74 (line 190), the chassis 72 (line 192), and a canopy of the detector 82 (line 194). Here, modeling has shown a significant iron contribution from the protective cover 106 around the external neutron shield 104 on the outside of the collar 70. A strong impact arises from the salinity of the drilling fluid 24 and/or borehole fluid because of the large thermal neutron capture cross section of Cl. In the presence of high salinity, fewer thermal neutrons may reach the downhole tool 68 from the borehole 26 or the mud flow tube 74. If the salinity of the formation 12 is relatively high, fewer neutrons will diffuse back into the borehole 26 and more may interact with the protective cover 106, while the number of neutrons entering from the mud flow tube 74 may be virtually unchanged. One may observe a decrease in the relative contribution from the protective cover 106 (line 186) (fewer neutrons interact) compared to the flow tube (line 190) (approximately the same number of neutrons). The following logging environments were considered, various of which are noted the plots 180 and/or 200:

- 0-p.u. limestone, with fresh water in the 8-inch borehole and the mud channel.
- 15-p.u. limestone, with fresh water in the 8-inch borehole, mud channel and formation
- 42-p.u. limestone
  - Fresh water in the 8-inch borehole and formation
  - Fresh water in the 8-inch borehole and 200-ppk NaCl brine in the formation
  - 200 ppk brine in the 8-inch borehole, mud channel and formation
- Water tank filled with 200-ppk brine As can be seen, the protective cover 106 has a significant total contribution and a significant environmental variation, while the collar 184 contribution shows little variability. Not unexpectedly, the contribution from the flow tube 74 is sensitive to environmental variations as well. It may be noted here that the contribution from the protective cover 106 and the contribution from the flow tube 74 may not depend on the environment in the same way. This means that their relative contributions to the tool noise may change with changes in the environment. If the shape of the gamma ray background spectrum from the protective cover 106 is different from the shape of the spectrum from the flow tube 74, then two noise background spectra may be used for an accurate description of the spectral noise from the tool.

Figure 9:
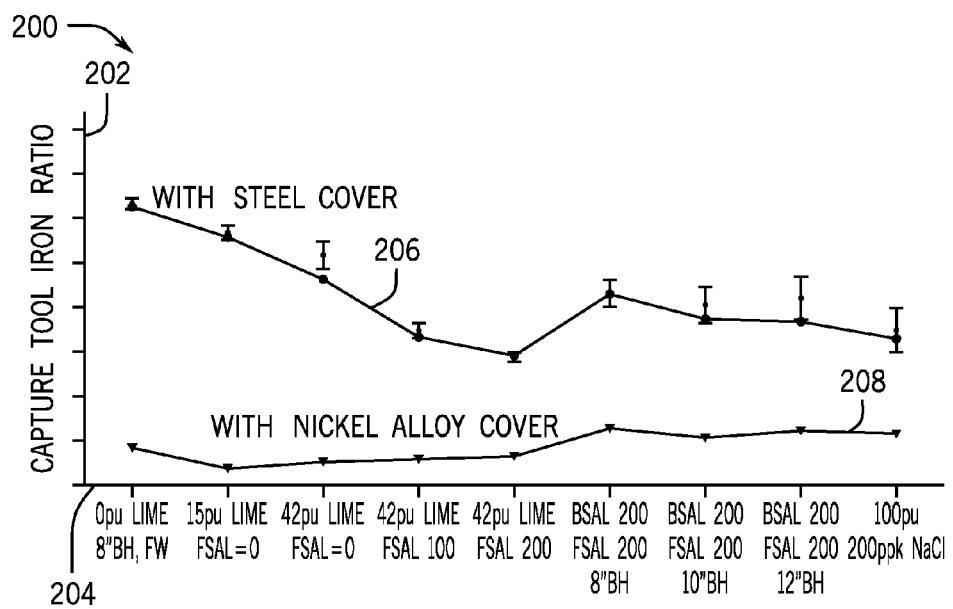
FIG. 9 is a plot comparing a tool noise contribution of a steel neutron shield cover as compared to a nickel alloy neutron shield cover, in accordance with an embodiment.

In a plot 200 of FIG. 9, two different materials of the protective cover 106 are modeled. An ordinate 202 of the plot 200 illustrates a ratio of capture contribution and an abscissa 204 represents various modeled logging environments. Shown in the plot 200 are contributions that occur when the protective cover 106 is made of steel (line 206) and when the protective cover 106 is made of nickel alloy (e.g., INCONEL®) (line 208). Specifically, the line 206 illustrates modeling results for non-magnetic stainless steel 15-15HS containing >50% Fe and the line 208 illustrates modeling results for INCONEL®-718 containing about 18% Fe. As may be appreciated, replacing the steel cover 106 with a cover 106 made from a nickel alloy brings a large reduction in the tool iron signal, as verified by experiment and modeling. Note that compared to the plot 180 of FIG. 8, additional logging environments were considered. That is, in addition to modeling a 100-ppk borehole salinity, the effect of larger boreholes was investigated in the presence of large borehole signals from the neutron capture by chlorine (i.e. high borehole and formation salinity). In sum, choosing the protective cover 106 to be a nickel alloy (e.g., INCONEL®) rather than steel may produce a large reduction in the unwanted iron signal while also reducing variability of the background signal as a function of environmental variables.

Figure 10:
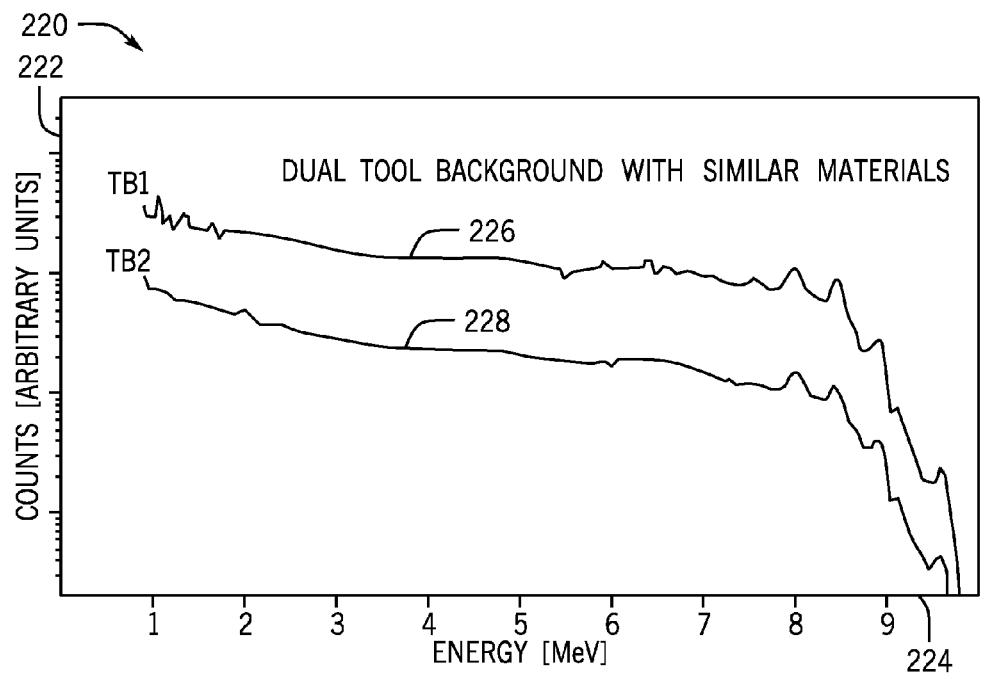
FIG. 10 is a plot showing a commonality of tool noise background spectra from two different areas of the composition-matched downhole tool, in accordance with an embodiment.

When the cover 106 is well-matched to the inner flow tube 74 (as in the case of the nickel alloy), it may reduce both the overall level and the environmental sensitivity of the iron signal from the downhole tool 68 that may be accounted for in post processing. Moreover, by composition-matching the various parts of the downhole tool 68, the varying contributions from different parts of the downhole tool 68 as a function of the environmental conditions may be taken into account without using more than one standard spectrum. Indeed, by avoiding the use of multiple standard spectra, the statistical uncertainty of the various spectral yields and, in particular, the computed formation Fe contribution may be reduced. A spectral plot 220 of FIG. 10, which includes an ordinate 222 showing gamma ray counts and an abscissa 224 showing gamma ray energy, models two tool backgrounds from different parts of the downhole tool 68. Curves 226 and 228 represents tool background spectra from disparate parts of the downhole tool 68. By using similar materials, such as high Ni-alloys, both inside and outside the downhole tool 68, the tool background spectra for neutrons entering from the mud flow tube 74 (curve 228) and neutrons entering from the borehole 26 (curve 226) may become virtually indistinguishable. This makes it possible to use a single tool background standard without incurring biases in the tool answer.

Figure 11:
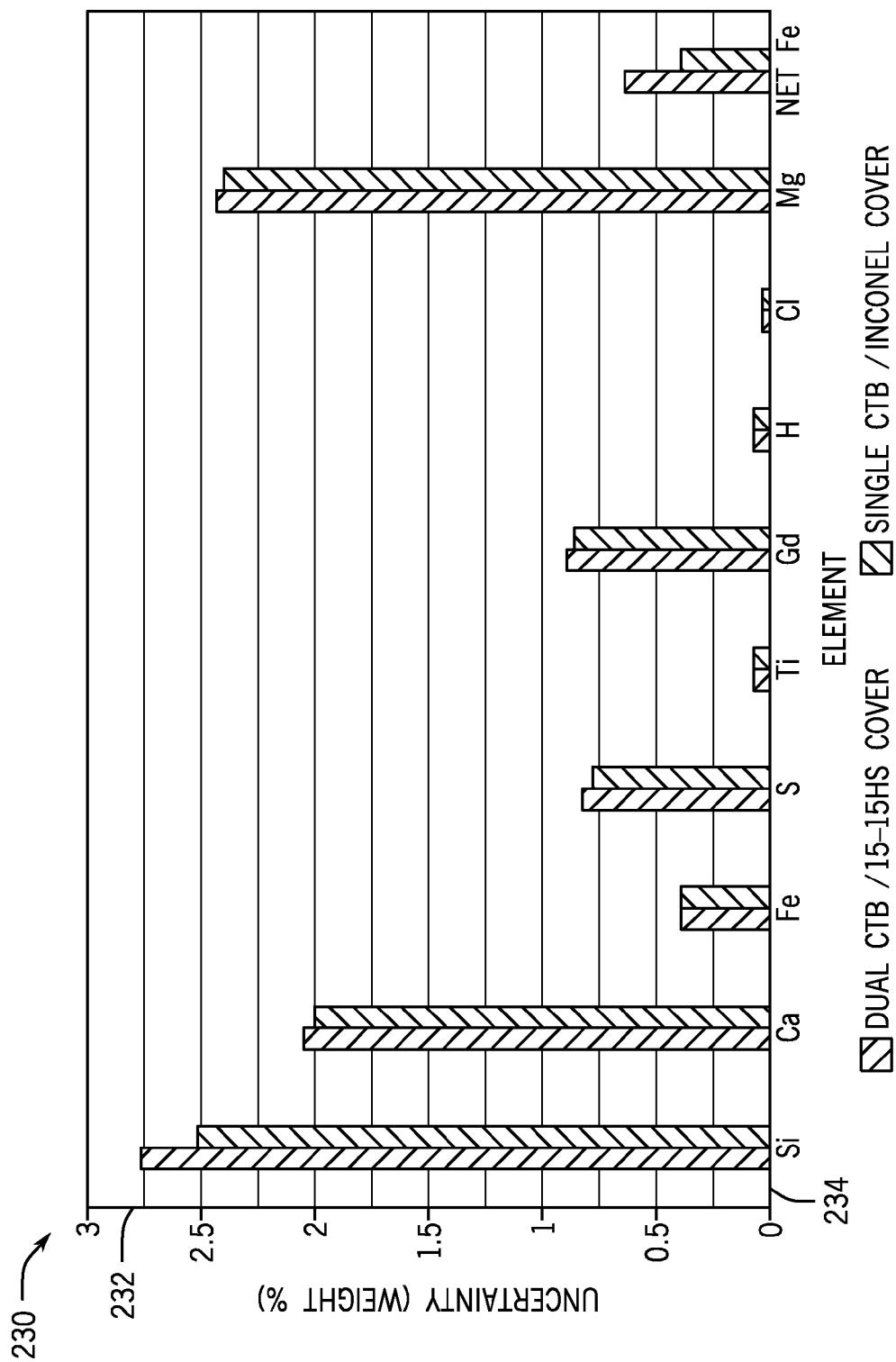
FIG. 11 is a plot showing experimental results of using a tool with a single tool noise background spectrum rather than two tool noise background spectra, in accordance with an embodiment.

The use of a single tool background standard may have a substantial impact on the precision of the Fe-measurement. In a plot 230 of FIG. 11, an ordinate 232 shows the uncertainty associated with precision by percent weight and an abscissa 234 indicates various modeled elements of the formation 12. The uncertainties of the several formation elements determined through capture spectroscopy are listed for the case of single and dual capture tool background standards (CTB). Not unexpectedly, the use of a single standard as taught by this disclosure reduces the uncertainty of all the spectral yields. However, the drop in the uncertainty of the net (formation) iron signal is dramatic. The drop by almost 40% means that, for the same precision, the rate of penetration of the downhole tool 68 could be increased by almost a factor 3, while still attaining the same precision of the net-Fe yield that was obtained with dual CTB.

Figure 12:
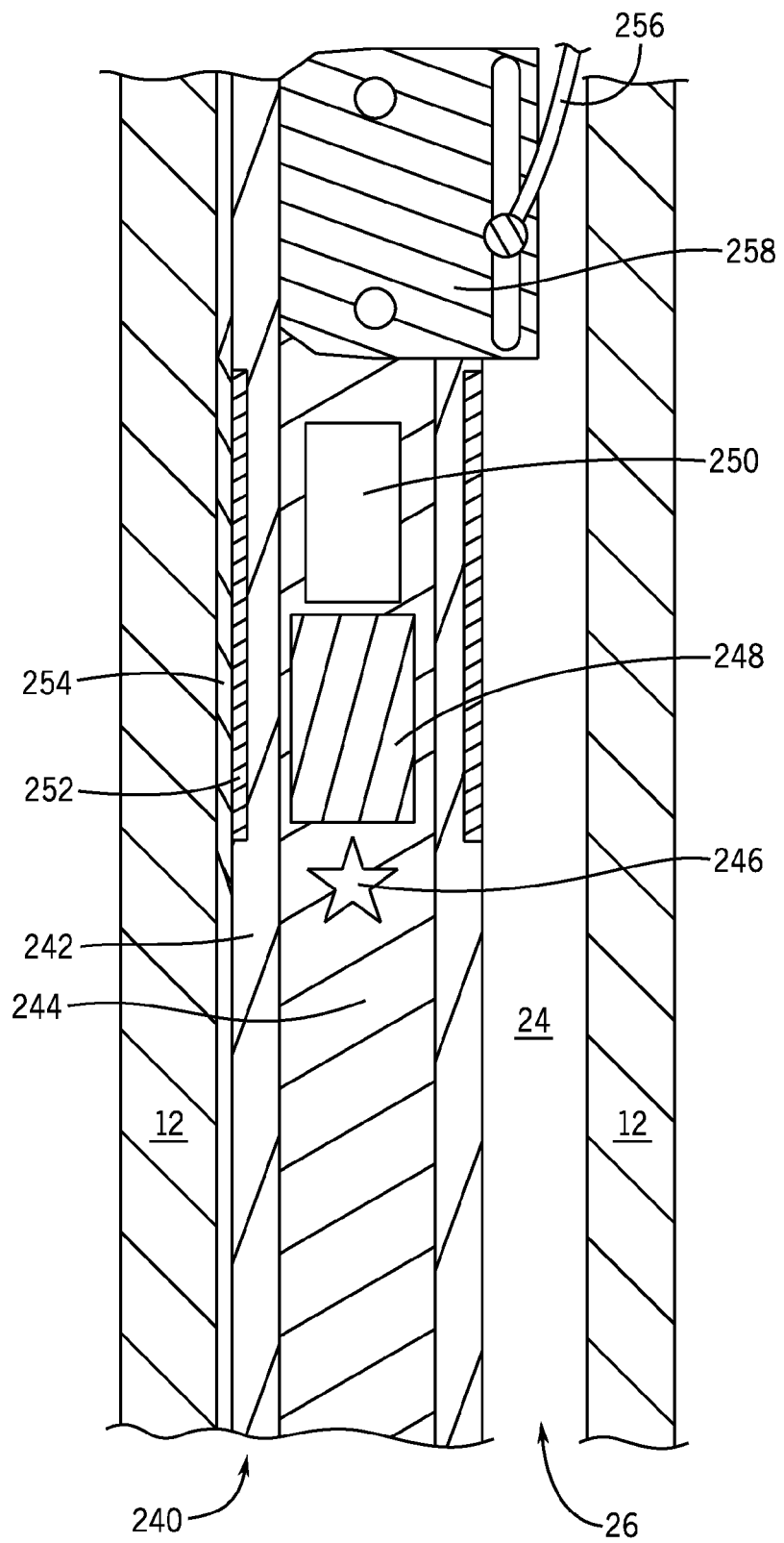
FIG. 12 is a block diagram of a wireline tool that includes composition-matched materials and neutron shielding that produce a single tool noise background, in accordance with an embodiment.

FIG. 12 shows a wireline downhole tool 240 with at least two parts that may contribute substantially to the tool noise background spectrum. The wireline downhole tool 240 is shown in the formation 12, which is traversed by a borehole 26. The wireline downhole tool 240 includes a tool housing 242 that includes a tool chassis 244. A neutron source 246, which may be any suitable neutron source, including those discussed above, may emit neutrons into the formation 12. A neutron shield 248 may prevent many of the neutrons from directly entering a gamma ray detector 250 (e.g., a scintillation detector). Additional neutron shielding 252 may be disposed on around the tool housing 242. The neutron shielding 252 may include a neutron-absorbing material, which reduces the number of neutrons entering the wireline downhole tool 240 from the borehole 26. A protective cover 254 may protect the neutron shielding 252 from wear and abrasion.

The wireline downhole tool 240 may be pushed against the formation 12 by a bowspring 256 (shown only partially), which is held and guided in a bowspring shoe 258 mounted on the tool housing 242. In order to obtain good eccentralization of the measurement section (e.g., in this example, the measurement section includes the gamma ray detector 250, neutron source 246, and neutron shielding 248) of the wireline downhole tool 240, the bow spring shoe 258 may be mounted in proximity to the measurement section. The bowspring 256 may be located not directly behind the measurement section but rather above or below as the material of the bowspring 256 may introduce a variable background, which may depend on the borehole size and on the composition of the mud 24. Moreover, since the protective cover 254 itself may not be shielded against neutrons, it may contribute substantially to the tool noise background spectrum. Similarly, the bowspring shoe 258 and the attached bowspring 256 may have little or no neutron shielding and therefore may also contribute strongly to the tool background noise spectrum. The relative fraction of the two contributions may depend on environmental factors, such as formation porosity and salinity and on the borehole size and mud composition, for example. By selecting substantially similar compositions of these tool parts (e.g., the protective cover 254, the bowspring 256, and/or the bowspring shoe 258), the background noise spectral shape of the two may be similar, so as to allow the use of a single background noise standard for spectral processing.

Figure 13:
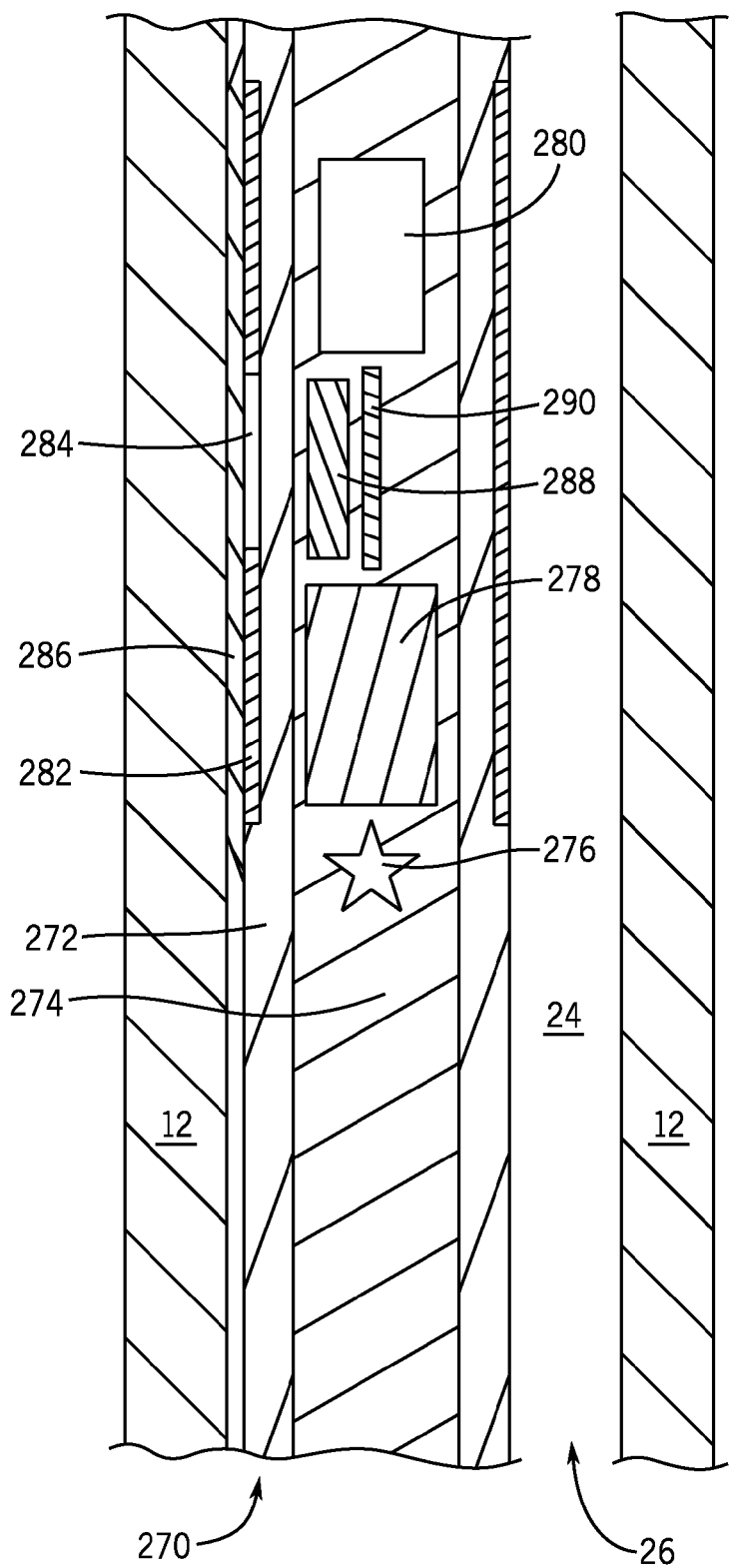
FIG. 13 is a block diagram of a different embodiment of a wireline tool that includes composition-matched materials and neutron shielding that produce a single tool noise background, in accordance with an embodiment.

Another embodiment is shown in FIG. 13. This figure shows a wireline downhole tool 270 that detects both neutrons and gamma rays. The wireline downhole tool 270 is shown in the formation 12, which is traversed by a borehole 26. The wireline downhole tool 270 includes a tool housing 272 that includes a tool chassis 274. A neutron source 276, which may be any suitable neutron source, including those discussed above, may emit neutrons into the formation 12. A neutron shield 278 may prevent many of the neutrons from directly entering a gamma ray detector 280 (e.g., a scintillation detector) and other components. Additional neutron shielding 282 may be disposed on around the tool housing 272. The neutron shielding 272 may include a neutron-absorbing material, which reduces the number of neutrons entering the wireline downhole tool 270 from the borehole 26. A neutron window 284 may permit neutrons to enter the downhole tool for detection, and a protective cover 286 may protect the neutron shielding 252 and the neutron window 284 from wear and abrasion. The neutron window 284 may facilitate the travel of neutrons to reach a neutron detector 288.

In the downhole tool 270 of FIG. 13, there are some tool parts that may contribute substantially to the tool background noise spectrum. These may include, for example, the protective cover 286, which may contribute similarly to the noise background as in the example of FIG. 12; and the housing 272 and/or the chassis 274 near the neutron window 284. The chassis 274 contribution may be reduced by including neutron shielding 290, which may be behind and/or partially around the neutron detector 288 to prevent neutrons from reaching most of the chassis 274. As in the example of FIG. 12, the two parts may have differing relative contributions depending on environmental effects. As such, by selecting substantially similar compositions of these tool parts, the background noise spectral shape may be similar, so as to allow the use of a single background noise standard for spectral processing.

The various embodiments discussed above are provided by way of example. Moreover, particular configurations discussed with reference to one type of tool (e.g., the downhole tool 68, 110, or 140) may be used in combination with another. To provide only a few examples, the cover 106 of the downhole tool 68 is described as reducing uncertainty when matched to the flow tube 74. Similarly, the covers 134 may be matched in the mandrel tool 110 and/or the flow tube 160 may be matched to a stabilizer 156 in the stabilizer-mounted tool 140.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method comprising:
emitting neutrons using a neutron source in a downhole tool into a surrounding formation to generate formation gamma rays, wherein some of the neutrons interact with a material of a first tool part of the downhole tool to generate first tool gamma rays and wherein some of the neutrons interact with a material of a second tool part of the downhole tool to generate second tool gamma rays;
detecting gamma ray spectra of at least some of the formation gamma rays, the first tool gamma rays, and the second tool gamma rays using a gamma ray detector, wherein the first tool gamma rays and the second tool gamma rays detected by the detector have a substantially similar spectral shape in a spectral energy range of interest; and
using a processor to analyze the spectra of the first tool gamma rays and the second tool gamma rays using a single tool background standard,
wherein the downhole tool comprises a logging-while-drilling tool, the first tool part comprises a protective cover on an outer diameter of the downhole tool, and the second tool part comprises a material lining an exterior surface of an internal drilling fluid conduit,
wherein the protective cover on the outer diameter of the downhole tool covers a first layer of a neutron-absorbing material that at least partially shields the downhole tool from penetration by neutrons from a borehole and wherein the internal drilling fluid conduit is at least partially surrounded by a second layer of the neutron-absorbing material that at least partially shields the downhole tool from penetration by neutrons from within the internal drilling fluid conduit.

2. The method of claim 1, wherein the material of the first tool part and the material of the second tool part have substantially the same composition, thereby causing the first tool gamma rays and the second tool gamma rays detected by the detector to have the substantially similar spectral shape.

3. The method of claim 1, wherein the protective cover on the outer diameter of the downhole tool and the internal drilling fluid conduit are both formed from a nickel alloy, thereby causing the first tool gamma rays and the second tool gamma rays detected by the detector to have the substantially similar spectral shape, wherein the substantially similar spectral shape differs substantially from a spectral shape of the formation gamma rays.

4. The method of claim 1, wherein the material of the first tool part and the material of the second tool part comprise elements that differ from elements of the formation such that the substantially similar spectral shape of the first tool gamma rays and the second tool gamma rays differs substantially from a spectral shape of the formation gamma rays.

5. A downhole tool comprising:
a neutron source configured to emit neutrons into the geological formation to generate formation gamma rays, some of the neutrons penetrating the downhole tool to generate tool gamma rays through interactions with different components of the downhole tool;
a gamma ray detector configured to detect a spectroscopy signal of gamma ray spectra of at least some of the formation gamma rays and some of the tool gamma rays;
wherein spectra of the tool gamma rays deriving from at least two different tool parts of the downhole tool have substantially the same spectral shape to enable the spectra of the tool gamma rays to be at least partially removed from the spectroscopy signal using a single tool background standard spectrum, wherein the two tool parts of the downhole tool comprise the two tool parts most likely to produce a variable amount of tool gamma rays in different borehole or formation environments, wherein the downhole tool comprises an external neutron shield covered by an external protective cover on an outer diameter of a collar and an internal neutron shield behind a material disposed on an interface of an internal drilling fluid conduit.

6. The downhole tool of claim 5, wherein the external protective cover and the internal drilling fluid conduit are configured to generate tool gamma rays having substantially the same gamma ray spectra.

7. The downhole tool of claim 5, wherein the external neutron shield and the internal neutron shield are configured to generate tool gamma rays having substantially the same gamma ray spectra.

8. The downhole tool of claim 5, wherein the external protective cover and the internal drilling fluid conduit both comprise a common inert structural material and the internal neutron shield and the external neutron shield both comprise the same neutron-absorbing materials.

9. The downhole tool of claim 5, wherein the external neutron shield and the internal neutron shield comprise one or more neutron-absorbing materials, wherein the neutron-absorbing materials comprise Li, enriched $^6$Li, B, enriched $^{10}$B, a borosilicate, Cd, Sm, or Gd, or any combination thereof.

10. The downhole tool of claim 5, wherein the first tool part and the second tool part both comprise a nickel alloy.

11. The downhole tool of claim 5, wherein the downhole tool comprises a stabilizer-mounted logging-while-drilling tool or an annular logging-while-drilling tool, or both.

12. The downhole tool of claim 5, wherein the downhole tool comprises a mandrel logging-while-drilling tool.

13. The downhole tool of claim 5, wherein each of the two tool parts is a different one of the following:
    the tool collar;
    the protective cover;
    the gamma ray detector;
    the material lining the exterior surface of the internal drilling fluid conduit;
    a tool chassis;
    a canopy of the gamma ray detector.

14. A downhole tool comprising:
    a collar configured to be placed into a geological formation;
    an internal drilling fluid conduit disposed within the collar;
    a neutron source configured to emit neutrons into the geological formation to generate formation gamma rays, some of the neutrons penetrating the downhole tool to generate tool gamma rays through interactions with different components of the downhole tool;
    a gamma ray detector configured to detect a spectroscopy signal of gamma ray spectra of at least some of the formation gamma rays and some of the tool gamma rays;
    wherein spectra of the tool gamma rays deriving from at least an exterior tool part on an outer diameter of the collar and an interior tool part on the internal drilling fluid conduit have substantially the same spectral shape to enable the spectra of the tool gamma rays to be at least partially removed from the spectroscopy signal using a single tool background standard spectrum.

15. The downhole tool of claim 14, wherein the exterior tool part and the interior tool part comprise the same material that comprises less than approximately 20% iron.

* * * * *